US008433734B2

US 8,433,734 B2

(12) United States Patent
Liu et al.

(10) Patent No.: US 8,433,734 B2
(45) Date of Patent: Apr. 30, 2013

(54) SELECTING A FILE PATH OF A REMOVABLE STORAGE DEVICE BASED ON A ROOT DIRECTORY SIZE COMPARISON WITH A HOST DEVICE

(75) Inventors: Xian Jun Liu, San Jose, CA (US); Po Yuan, Milpitas, CA (US)

(73) Assignee: Sandisk Technologies Inc., Plano, TX (US)

( * ) Notice: Subject to any disclaimer, the term of this patent is extended or adjusted under 35 U.S.C. 154(b) by 897 days.

(21) Appl. No.: 12/494,233

(22) Filed: Jun. 29, 2009

(65) Prior Publication Data

US 2010/0332728 A1    Dec. 30, 2010

(51) Int. Cl.
*G06F 17/30* (2006.01)

(52) U.S. Cl.
USPC ............................. 707/824; 707/694; 707/812

(58) Field of Classification Search .................... 707/824
See application file for complete search history.

(56) References Cited

U.S. PATENT DOCUMENTS

| 4,888,773 | A | 12/1989 | Arlington et al. | |
| 6,370,545 | B1 * | 4/2002 | Shaath | 369/272.1 |
| 7,062,261 | B2 | 6/2006 | Goldstein et al. | |
| 7,831,552 | B2 * | 11/2010 | Borthakur et al. | 707/615 |
| 7,840,617 | B2 * | 11/2010 | Ito | 707/822 |
| 2007/0106630 | A1 * | 5/2007 | Fitzgerald et al. | 707/1 |
| 2008/0140933 | A1 * | 6/2008 | Choi | 711/115 |
| 2009/0298480 | A1 * | 12/2009 | Khambete et al. | 455/414.1 |
| 2010/0153672 | A1 * | 6/2010 | Jogand-Coulomb et al. | 711/164 |

OTHER PUBLICATIONS

Sing Li & Jonathan Knudsen, "Beginning J2ME: From Novice to Professional", 2005, Springer Publishing, 3rd ed., Chapter 9, pp. 117-142.*
Biswajit Sarkar, "Working With the Java ME FileConnection API on Physical Devices", Java.net, posted on Mar. 29, 2007.*
BlackBerry JDE 4.5.0 API Reference: Class FileSystemRegistry, Research In Motion Ltd., 2008, pp. 1-3.*
"CS001200—Checking Memory Card in Java ME," http://wiki.forum.nokia.com/index.php/CS001200_—_Checking_memory_card_in_Java_ME, printed Mar. 18, 2009, 7 pages.

* cited by examiner

*Primary Examiner* — Rehana Perveen
*Assistant Examiner* — Scott A Waldron
(74) *Attorney, Agent, or Firm* — Toler Law Group, PC (57) ABSTRACT

Systems and methods of identifying a file path of a removable storage device are disclosed. A method includes, at a host device that is coupled to the removable storage device, selecting a file path that is associated with the removable storage device by accessing a size associated with a root directory accessible to the host device, where the root directory corresponds to the removable storage device. The file path is selected based upon the size associated with the root directory. The selected file path is verified by initiating a memory access operation using the selected file path.

28 Claims, 5 Drawing Sheets

SELECTING A FILE PATH OF A REMOVABLE STORAGE DEVICE BASED ON A ROOT DIRECTORY SIZE COMPARISON WITH A HOST DEVICE

FIELD OF THE DISCLOSURE

The present disclosure is generally related to storage devices, and more particularly, to accessing data stored on removable storage devices.

BACKGROUND

Memory cards and other removable storage devices increase the memory capacity of computing platforms, such as phone devices, personal digital assistants, and computers. An application executing on such a computing platform accesses data on a removable storage device by using a known file path, typically including a drive letter.

Respective proprietary computing platforms use different file paths to access removable storage devices. Different versions of applications are consequently developed for each respective computing platform to support the different file paths. For example, multiple versions of a phone application may be developed to communicate with the respective operating systems of different handsets. Such application development for multiple platforms adds costs and complexity during product development.

SUMMARY

Systems and methods of identifying a file path to a removable storage device are disclosed. A method includes selecting a file path at a host device where the file path is associated with the removable storage device. The file path may be selected based upon the size of a root directory of a file system that is accessible to the host device. The root directory corresponds to the removable storage device. A root directory may include and comprise the origin of all other directories in a hierarchical file system. The selected file path may be verified by initiating a memory access operation using the selected file path. A result of the memory access operation indicates whether the host has access to the removable storage device.

DETAILED DESCRIPTION

Figure 1:
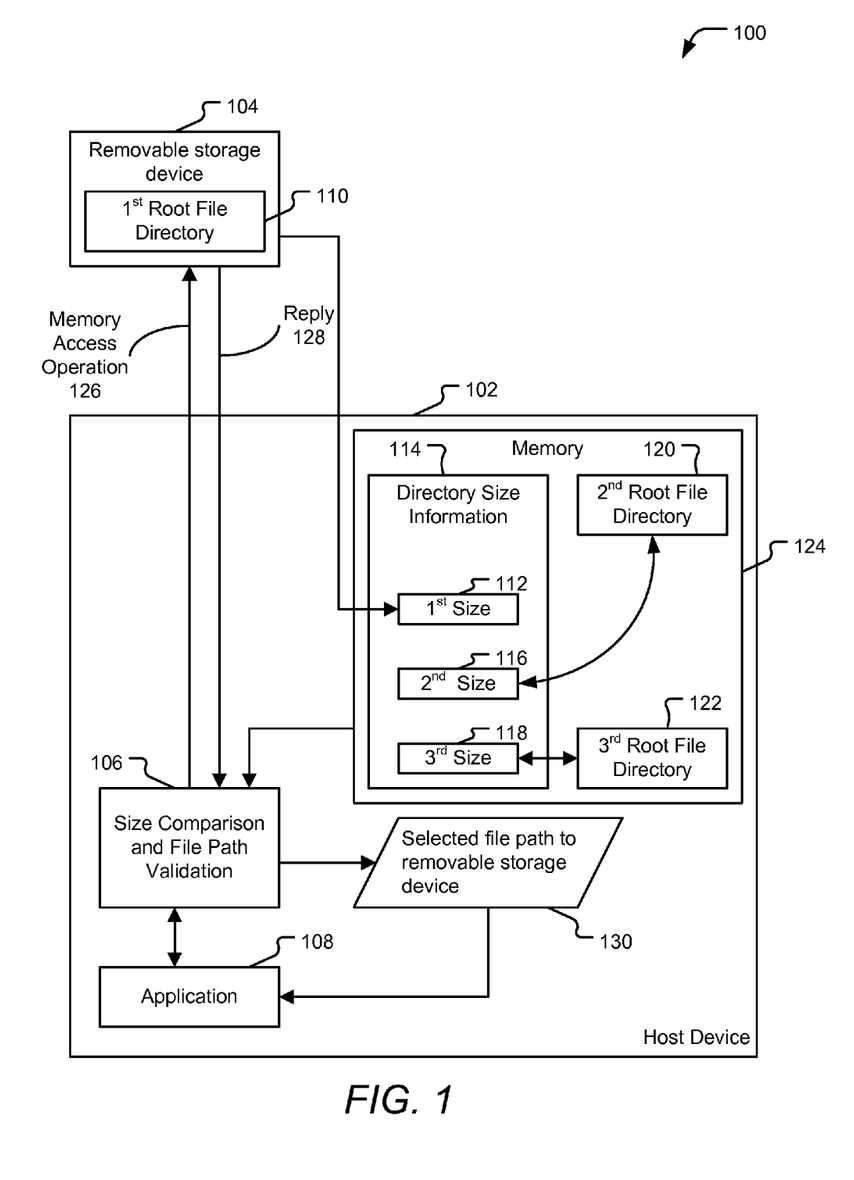
FIG. 1 is a block diagram of a first particular embodiment of a system to identify a file path of a removable storage device.

Referring to FIG. 1, an illustrative embodiment of a system that may be used to identify a file path of a removable storage device is depicted and generally designated 100. The system 100 may include a host device 102, such as a telephone, personal digital assistant, or other computing device. The host device 102 is operatively coupled to a removable storage device 104, such as a Secure Digital (SD) or other type of memory card.

The host device 102 may include a size comparison and file path validation module 106 for identifying a file path of the removable storage device 104. The file path may be used by an application 108 at the host device 102 to access data stored within the removable storage device 104. For example, the application 108 may include a bytecode application that is interpreted by a virtual machine (not shown) implemented at the host device 102 that generates a request for encrypted data stored on the removable storage device 104. As an illustration, the application 108 may be a Java application interpreted by a Java Virtual Machine.

The size comparison and file path validation module 106 may select a file path that is associated with the removable storage device 104 by retrieving or otherwise accessing a first root directory 110 stored within memory accessible to the host device 102 and corresponding to the removable storage device 104. The size comparison and file path validation module 106 may select the file path 130 based upon a first size 112 associated with the first root directory 110. In a particular embodiment, the size comparison and file path validation module 106 may verify the selected file path by initiating a memory access operation using the selected file path 130. The result of the memory access operation may indicate that the host 102 has obtained access to the removable memory storage device 104.

The size 112 associated with the first root directory 110 may be included within the host device 102 as directory size information 114. The directory size information 114 may also include second and third sizes 116, 118 associated with respective second and third root directories 120, 122 stored within a memory 124 of the host device 102. In a particular embodiment, the first size 112 associated with the first root directory 110 is different than the second and third sizes 116, 118 associated with respective root directories 120, 122 that correspond to file system directories at the host device 102. For example, the first size 112 may be smaller or larger than the second size 116 and third size 118. The second size 116 and the third size 118 associated with respective root directories 120, 122 that correspond to the host device 102 may be the same size as each other. For example, the second and third sizes 116, 118 may each equal the total memory capacity of the host device 102. In contrast, the first size 112 may equal the total memory capacity of the removable storage device 104.

In a particular embodiment, the size comparison and file path validation module 106 may initiate a memory access operation 126, such as a validation command, to verify the selected file path 130. For example, the validation command may include a test signal sent to a test file (not shown) on the removable storage device 104. The test file may be created by the host device 102 to verify a file path of the removable storage device 104. In such an example, the host device 102 knows the location of the test file and may use the known location to verify that the test file may be accessed using the validation command. The file path validation module 106 may identify a result 128 of the memory access operation 126 as indicating the removable storage device. For instance, the host device 102 may await an expected response signal after sending the validation command to the removable storage device 104.

In a particular embodiment, the validation command may be used to verify an electronic credential stored on the removable storage device 104. For example, a cryptographic key may be stored as verification data and read from the removable storage device 104 to verify the file path 130. In a particular embodiment, a digital certificate stored in the removable storage device 104 may be verified by the host device 102.

FIG. 1 illustrates how the size comparison and file path validation module 106 may determine that the size 112 associated with the first root directory 110 corresponding to the removable storage device 104 differs from the sizes 116, 118 associated with respective root directories 120, 122 that correspond to memory at the host device 102. The size comparison and file path validation module 106 may use this information to initially identify and then validate the file path 130 to the removable storage device 104.

Figure 2:
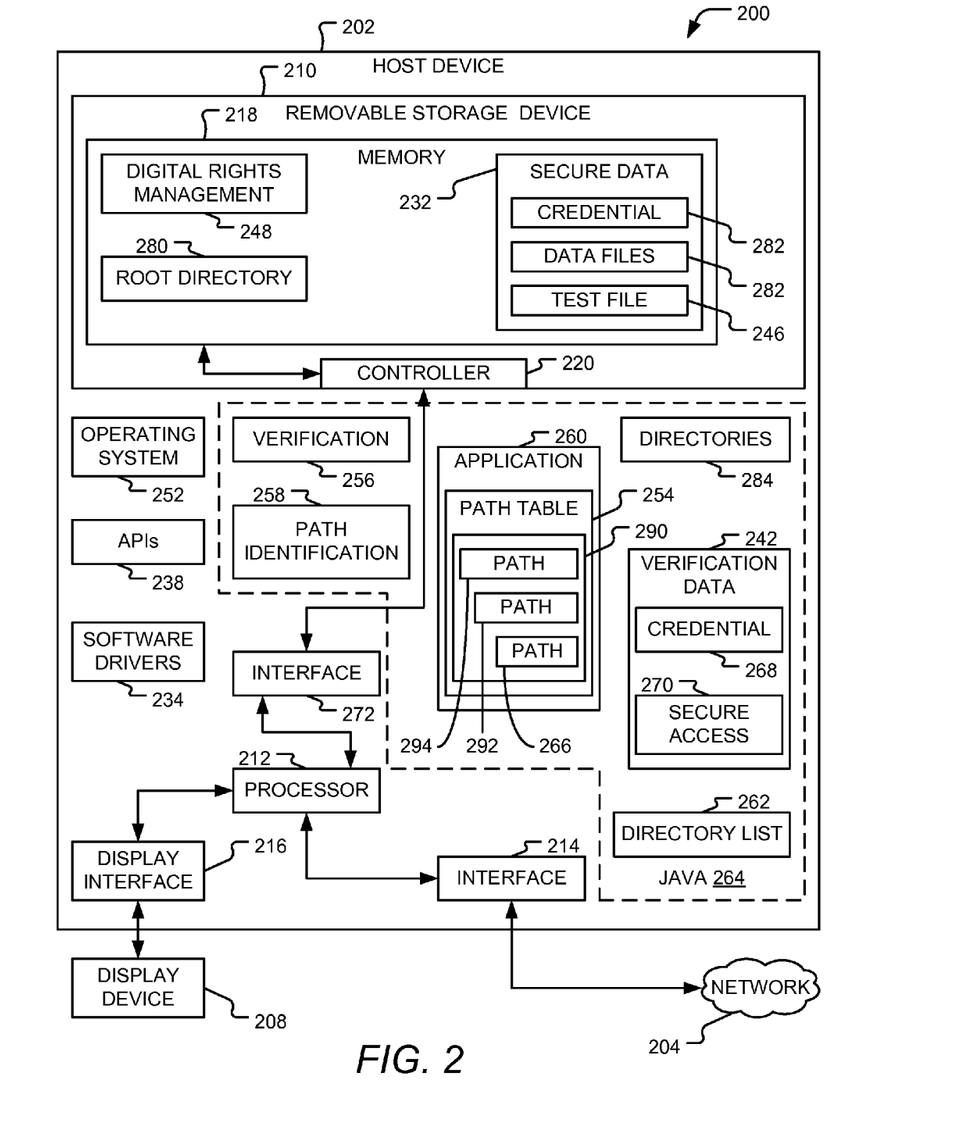
FIG. 2 is a block diagram of a second particular embodiment of a system to identify a file path of a removable storage device.

FIG. 2 is a block diagram of an illustrative embodiment of a system 200 that includes a host device 202 and a removable storage device 210 that is accessible to the host device 202. While the removable storage device 210 is illustrated as seated within the host device 202, the removable storage device 210 may be an external memory device that is accessible to the host device 202 via one or more interfaces, such as a universal serial bus (USB) interface, a small computer system interface (SCSI), an Advanced Technology Attachment (ATA), an Integrated Drive Electronics (IDE) interface, a Serial ATA interface, a FireWire interface, other interfaces, or any combination thereof. For example, the removable storage device 210 may be a secure flash memory card, e.g., a Secure Digital (SD) card, a smart card, a hard disk, another memory type, or any combination thereof.

The host device 202 may be coupled to a network 204, such as a wireless network. The host device 202 may communicate display data to a display device 208. The display device 208 may be coupled to the host device 202 or integrated with the host device 202.

The host device 202 includes the removable storage device 210, a processor 212 that has access to the removable storage device 210 via an interface 272, a display interface 216, and a network interface 214 that is responsive to the network 204. The interface 272 is configured to receive the removable storage device 210. The interface 272 may include interface circuitry, such as bus connectors coupled to I/O buffers and latches and output driver circuitry, as well as a controller, to enable sending and receiving data via a bus connector to the removable storage device 210. The interface 272 may operate in accordance with a universal serial bus (USB) protocol. For example, the controller 220 may be programmed to receive USB protocol instructions and data from the host device 202 via the interface 272. The interface 272 may be configured to support additional communication protocols, such as a Secure Digital (SD) protocol, a small computer system interface (SCSI), parallel interface, a Compact Flash (CF) protocol, one or more other protocols, or any combination thereof.

The processor 212 is configured to automatically select a file path 266 based upon a size of a root directory 280 corresponding to the removable storage device 210. The processor 212 may verify the selected file path 266 and access the stored data on the removable storage device 210. The display interface 216 may receive data from the processor 212 and communicate the data to the display device 208 for display. The removable storage device 210 includes a memory 218 and a controller 220 that controls access to data stored at the memory 218. The controller 220 may use a Digital Rights Management component 248 of the memory 218 for regulating access to secure data 232.

The secure data 232 may include data files 246 used by an application 260 resident on the host device 202. A test file 250 may be created by the host device 202 to verify the file path 266 of the removable storage device 210. In such an example, the host device 202 knows the location of the test file 250 and may use the known location to verify that the test file 250 may be accessed by the host device 202.

In the embodiment of FIG. 2, the memory 218 includes an electronic credential 282. For example, a cryptographic key may be stored on the removable storage device 210 to allow the host device 202 to verify the file path 266. In a particular embodiment, the memory 218 of the removable storage device 210 also includes a root directory 280 similar to the first root directory 110 of FIG. 1.

The host device 202 includes software drivers 234 that may be executed by the processor 212 to communicate with various components of the host device 202, such as the display interface 216, the network interface 214, modems, other internal and peripheral hardware, or any combination thereof. Additionally, the host device 202 includes a representative application 260 and application program interfaces (APIs) 238 that may be executed by the processor 212 to verify that a selected file path is associated with the removable storage device 210. The application 260 may include a path table 254 storing file paths 290, such as the representative file paths 266, 292, and 294. For example, one or more file paths 266, 292, and 294 may include mapping information between the host device 202, such as a phone platform, and the removable storage device 210. To illustrate, when a Java application is launched, the path table 254 may be included within application memory to enable access to the removable storage device 210.

In a particular embodiment, the host device 202 may include a Java platform 264, as well as a plurality of root directories 284 associated with the host device 202. The root directories 284 may be similar to the second root directory 120 and the third root directory 122 of FIG. 1. A root directory list 262 may include data similar to the directory size information of FIG. 1. The root directory list 262 may be accessed to determine the sizes of the root directories 284 of the host device 202 and the root directory 280 of the removable storage device 210.

The host device 202 may include an operating system 252. The host device 202 of FIG. 2 also includes a path identification algorithm 258 for selecting the file path 266 to the removable storage device 210 and a verification algorithm 256 for verifying the selected file path 266 of the path table 254.

Verification data 242 may be accessed by the verification algorithm 256 to verify the selected file path 266. In a particular embodiment, the verification data 242 may include an electronic credential 268 to assist in verifying the selected file path 266. For example, a cryptographic key may be stored as verification data 242 and be used by the host device 202 to verify the selected file path 266.

During operation, the system 200 that may identify a file path of the removable storage device 210 at the host device 202 that is coupled to the removable storage device 210. Processes executed by the host device 202 may select one or more file paths 266 that may be associated with the removable storage device 210 by accessing a size associated with a root directory 280 accessible to the host device 202 and corresponding to the removable storage device 210. For example, when the file paths 290 do not provide sufficient information to the application 260 to determine a path to the removable storage device 210, a file path, such as the file path 266, may be selected based upon the size associated with the root directory 280, using a method described in further detail with respect to FIGS. 3-5. A selected file path 266 may be verified by initiating a memory access operation using the verified file path, such as the memory access operation 126 of FIG. 1. A result of the memory access operation, such as the reply 128 of FIG. 1, may be identified as indicating successful access to data stored at the removable memory storage device 210.

While the removable storage device 104 is shown in FIG. 1 as coupled to but external to the host device 102 and while the removable storage device 210 is shown in FIG. 2 as embedded within the host device 202, it should be understood that the functionality of each of the storage devices (e.g. 104 or 210), the functionality of the host devices (e.g. 102, 210), or any functionality of a system including a combination of a removable storage device and a host device may be independent of the location or position (e.g. embedded or external) of the removable storage device operatively coupled to a host. Thus, features or operations described with respect to the system 100 of FIG. 1 may also apply to the system 200 of FIG. 2 and vice versa.

Figure 3:
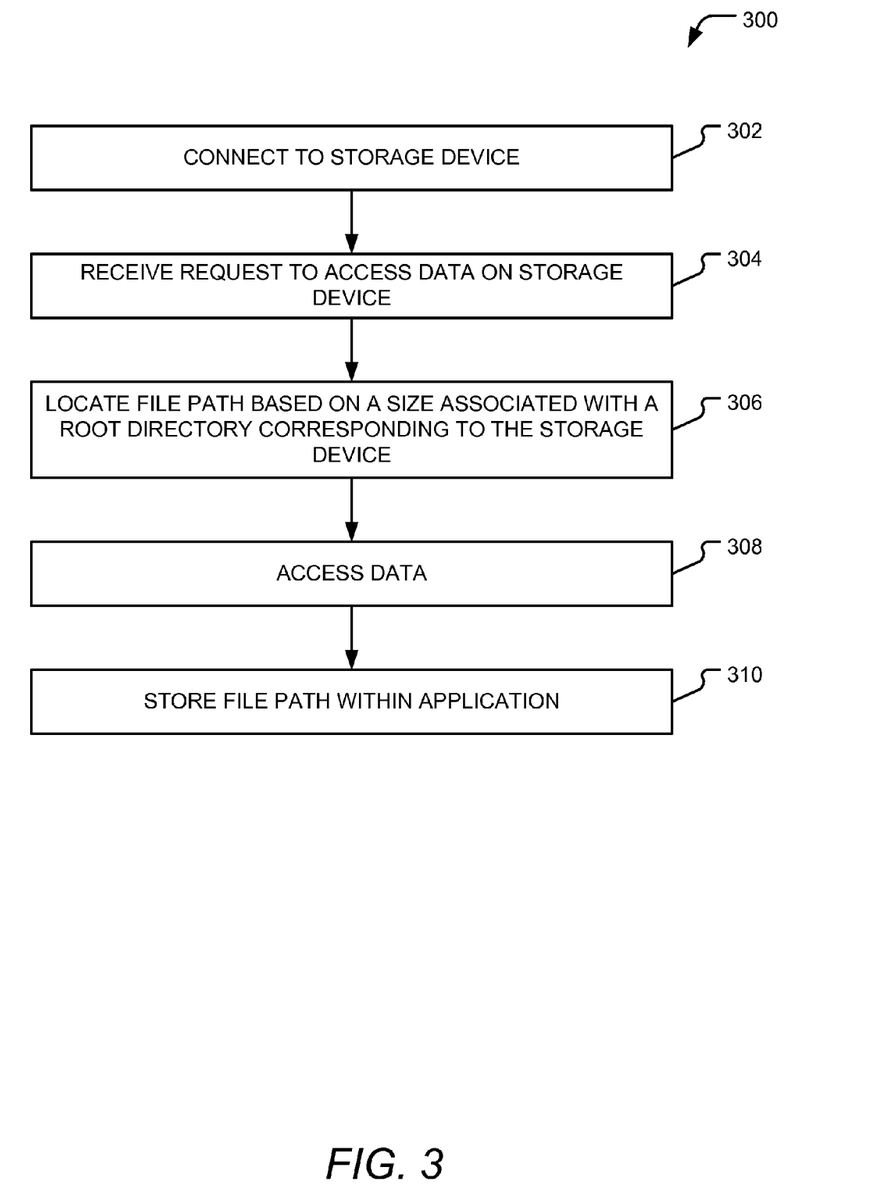
FIG. 3 is a flow diagram of a particular embodiment of a method of identifying a file path and accessing data of a removable storage device.

FIG. 3 is a flow diagram of a particular embodiment of a method 300 of identifying a file path and accessing data of a removable storage device. The method 300 of FIG. 3 includes processes that may be performed by a host device, such as the host device 102 of FIG. 1. At 302, the host device may be connected to a removable storage device. For example, the host device 102 of FIG. 1 may be coupled to the removable storage device 104 of FIG. 1.

A request to access data on the removable storage device may be received, at 304. For example, an application, such as the application 108 of FIG. 1, may request data stored on the removable storage device 104.

A file path may be selected based upon a size associated with a root directory that appears to correspond to the removable storage device, at 306. The root directory of the removable storage device may be smaller or larger than other root directories corresponding to the host device. The size of the root directories may correspond to the total memory capacity of the device associated with the root directory. The root directories associated with the host device, for example, may each reflect the total memory capacity of the host device. The memory capacity of the host device may differ from the memory capacity of the removable storage device, which may approximate the size of the root directory of the removable storage device. In the example of FIG. 1, the size 112 that corresponds to the first root directory 110 may be used to select the file path. Prior to accessing the data from the remote storage device, the method 300 may optimally include receiving a test file or other verification procedure.

The data stored on the removable storage device may be accessed using the selected file path, at 308. The file path may be stored for future use, at 310. For example, the application 108 of FIG. 1 may store the file path for subsequent access to the data of the removable storage device 104.

The method 300 enables an application to identify and use a file path of a removable storage device by providing an automated file path detection and validation process. The method 300 may facilitate data access for a requesting application resident on a host device without requiring multiple versions of the application for multiple platforms having differing directory naming conventions.

Figure 4:
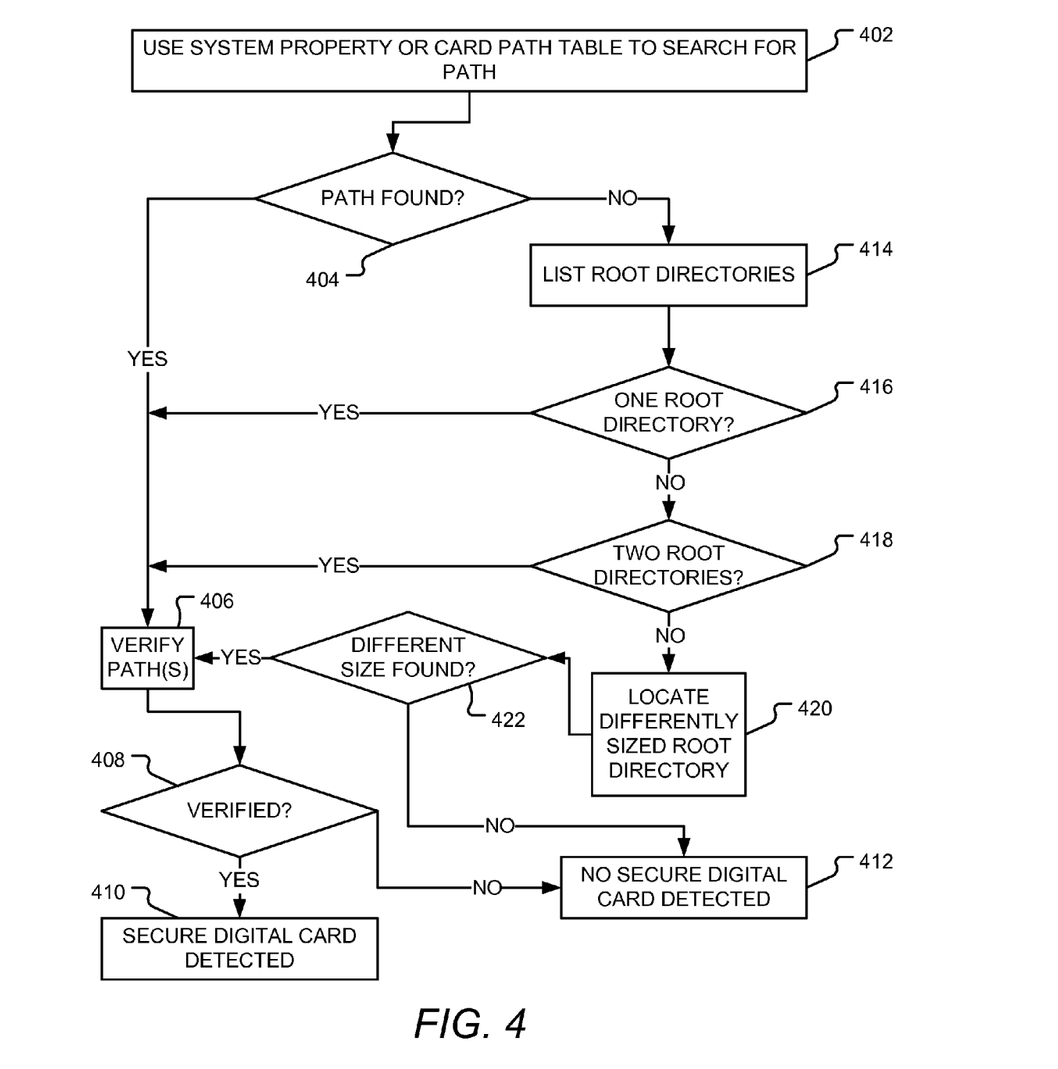
FIG. 4 is a flow diagram of a second particular embodiment of a method of identifying a file path of a removable storage device.

FIG. 4 is a flow diagram of a particular embodiment of a method 400 of identifying a file path of a removable storage device, such as a Secure Digital card. The method 400 may be performed by a host device, such as the host device 102 of FIG. 1. At 402, a host device on behalf of a requesting application may invoke a system property command or use a card path table to search for a file path to a removable storage device. For example, an attempt to locate the file path may be made using a memory card path table stored within an application, such as the file path 266 stored within the file path table 254 of FIG. 2. In another example, the file path may be located using a command configured to retrieve the file path from the removable storage device. For instance, a "fileconn.dir.memorycard" command or a "System.getProperty" command may be issued in an attempt to determine the file path.

A determination may be made whether the file path has been located, at 404. Where the file path is located, a verification of the file path may be attempted, at 406. For example, a test file, such as the test file 250 of FIG. 2, on the removable storage device may be accessed by the host to verify the file path. In another example, an electronic credential may be read from the removable storage device to verify the file path. For instance, the electronic credential 280 stored within the removable storage device 210 of FIG. 2 may be verified by the host device 202.

The determination of whether the file path is verified is made, at 408. When the path is verified, a Secure Digital card may be detected, at 410. When the file path is alternatively not verified, the absence of a Secure Digital card may be determined, at 412. In this manner, the method 400 may determine based on a failed verification attempt that a file path is unassociated with the removable storage device.

When a file path is not located, at 404, a list of root directories may be generated, at 414. The listed root directories may include root directories associated with both the host device and the removable storage device. The list may be generated in response to the file path not being found using a system property or the card path table.

A determination may be made as to whether there is one listed root directory, at 416. Where there is only one root directory, the file path may be verified, at 406. Alternatively, at 418, a determination may be made as to whether there are two root directories. Where there are two root directories listed, the file path for each of the two root directories may be verified, at 406.

Where there are more than two root directories, a differently sized root directory may be located, at 420. A size of a root directory may include the total capacity of the root directory's file system. For example, the total size of a root directory in a phone memory may be the total capacity of the phone memory, while the total size of a root directory of a memory card may be the total memory capacity of the memory card.

A determination may be made as to whether a differently sized root directory is present, at 422. For example, a listing of root directories, such as the root directories list 262 of FIG. 2, may be evaluated. When a differently sized root directory is found, the file path of the root directory may be verified, at 406. Otherwise, at 412, a determination may be made that no Secure Digital card is present when a differently sized root directory is not located.

The method 400 enables the identification of a file path of a removable storage device. The automated processes may enable access to data stored on the removable storage device in the absence of a previously known file path. An attempt may be made to locate the file path within a memory card path table, such as the path table 254 of FIG. 2, or by using a retrieval command, such as a "fileconn.dir.memorycard" command, prior to automatically selecting the file path associated with the removable storage device. The selection of the file path may be facilitated based upon size differences of respective root directories of a host device and the removable storage device.

Figure 5:
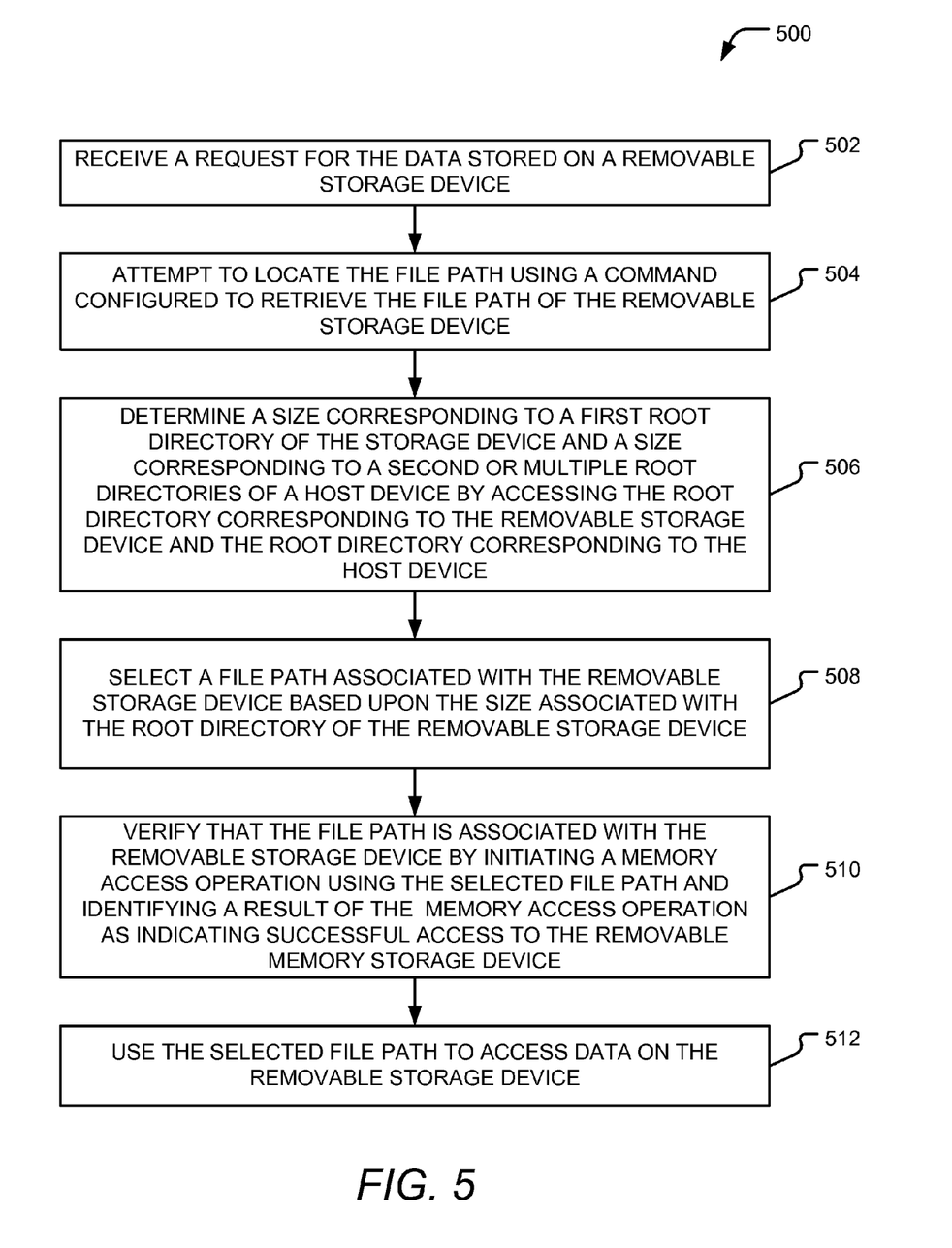
FIG. 5 is a flow diagram of a third particular embodiment of a method of identifying a file path and accessing data of a removable storage device.

FIG. 5 is a flow diagram of a particular embodiment of a method 500 of identifying a file path and accessing data of a removable storage device. A request may be received for data stored on a removable storage device, at 502. For example, an application, such as the application 108 of FIG. 1, may request data stored on the removable storage device 104.

An attempt may be made to locate the file path using a command configured to retrieve the file path of the removable storage device, at 504. For example, an attempt to locate the file path may be made using a memory card path table, such as the path table 254 of FIG. 2 stored within the application 260. In another example, the file path may be located using a command configured to retrieve the file path from the removable storage device. For instance, a "fileconn.dir.memorycard" command or a "System.getProperty" command may be issued in an attempt to determine the file path.

A size corresponding to a first root directory associated with a root directory of the removable storage device may be determined by accessing the first root directory, at 506. Also at 506, a size corresponding to a second or a plurality of root directories associated with a root directory of the host device may determined by accessing the second root directory (or multiple directories of the host device). For example, the first size 112 and the second size 116 of FIG. 1 may be determined for comparison.

The file path associated with the removable storage device may be automatically selected based upon the size corresponding to the root directory of the removable storage device, at 508. For example, a file path to the removable storage device may be selected based on the root directory of the removable storage device being a different size than other root directories of the host device.

The file path may be verified by initiating a memory access operation using the selected file path, at 510. A result of the memory access operation may indicate successful access to the removable storage device. An API, such as API 238 of FIG. 2, may be used to verify that the selected file path is associated with the removable storage device. For example, a test file may be created by the host device as part of a memory access operation to verify a file path of the removable storage device. In another example, an electronic credential on the removable storage device may be interrogated by the host device to validate the file path.

The selected file path may be used to access data from the removable storage device, at 512. For example, the application 108 of FIG. 1 may use the file path to access data on the removable storage device 104.

The method 500 may enable the identification and use of a file path of a removable storage device. The automated processes may facilitate data access for a requesting application resident on a host device using a single version of the application that is operable with a variety of host device types.

Although various components depicted herein are illustrated as block components and described in general terms, such components may include one or more microprocessors, state machines, or other circuits configured to enable the disclosed data storage devices, such as the size comparison and file path validation module 106 of FIG. 1, to perform the particular functions attributed to such components. For example, the size comparison and file path validation module 106 of FIG. 1 may represent one or more physical components, such as controllers, state machines, logic circuits, or other structures to enable the host device 102 to identify a file path to a removable storage device. In another example, the size comparison and file path validation module 106 of FIG. 1 may include a processor configured to automatically select the file path 130 based upon a size 112 of a root directory corresponding to the removable storage device 104, to verify the selected file path 130, and to access the stored data on the removable storage device 104.

For example, the size comparison and file path validation module 106 of FIG. 1 may be implemented using a microprocessor or microcontroller programmed to identify a path to a removable storage device. In a particular embodiment, the size comparison and file path validation module 106 of FIG. 1 includes executable instructions that are executed by a processor and the instructions may be stored at the memory 124. Alternatively, or in addition, executable instructions that are executed by the processor may be stored at a separate memory location, such as at the removable storage device 104 or at a read-only memory (ROM) (not shown) at the host device 102.

In a particular embodiment, the removable storage device 104 of FIG. 1 may be a portable device configured to be selectively coupled to one or more external devices. However, in other embodiments, the data storage device may be attached or embedded within one or more host devices, such as within a housing of a portable communication device. For example, the data storage device may be within a packaged apparatus such as a wireless telephone, personal digital assistant (PDA), gaming device or console, portable navigation device, or other device that uses internal non-volatile memory. In a particular embodiment, the data storage device 604 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of identifying a file path of a removable storage device, wherein the file path is unknown by a host device that is coupled to the removable storage device, the method comprising:
    at the host device:
        selecting a file path associated with the removable storage device by:
            receiving a first size associated with a first root directory accessible to the host device, wherein the first root directory corresponds to the removable storage device;
            comparing the first size to a second size of a second root directory corresponding to the host device;

determining that the first size associated with the root directory corresponding to the removable storage device differs from the second size associated with the root directory corresponding to the host device; and selecting the file path based upon the comparison of the first size and the second size; and verifying the selected file path by:
initiating a memory access operation using the selected file path; and
identifying a result of the memory access operation as indicating successful access to the removable memory storage device.

2. The method of claim 1, wherein the removable storage device includes a secure flash memory card.

3. The method of claim 1, wherein the removable storage device includes a Secure Digital (SD) card.

4. The method of claim 1, further comprising storing the selected file path within a memory device that is accessible to an application executing at the host device, and wherein the application is in communication with the removable storage device.

5. The method of claim 1, wherein the selected file path is selected from among a plurality of file paths stored within a memory.

6. The method of claim 1, further comprising accessing the root directory corresponding to the removable storage device and the root directory corresponding to the host device.

7. The method of claim 1, further comprising determining the first size associated with the root directory corresponding to the removable storage device and the second size associated with the root directory corresponding to the host device.

8. The method of claim 1, further comprising accessing a plurality of root directories associated with the host device.

9. The method of claim 1, further comprising retrieving the root directory stored in a memory and associated with the removable storage device.

10. The method of claim 1, further comprising using the selected file path to access data on the removable storage device.

11. The method of claim 1, further comprising receiving a request for data stored on the removable storage device from a bytecode application that is interpreted by a virtual machine implemented at the host device.

12. The method of claim 11, wherein the data is encrypted.

13. The method of claim 1, wherein the memory access operation comprises verifying an electronic credential stored within the removable storage device.

14. The method of claim 1, further comprising determining that the first size associated with the root directory differs from respective sizes associated with each of a plurality of directories stored within a memory.

15. The method of claim 1, wherein the memory access operation comprises sending a validation command to the removable storage device by the selected file path and receiving an expected response from the removable storage device.

16. The method of claim 1, further comprising determining that another file path is unassociated with the removable storage device using a failed verification attempt.

17. The method of claim 1, further comprising using an application programming interface to verify that the selected file path is associated with the removable storage device.

18. The method of claim 1, further comprising attempting to locate the file path within a memory card path table stored within the host device prior to automatically selecting the file path associated with the removable storage device.

19. The method of claim 1, further comprising executing a command configured to retrieve the file path from the removable storage device prior to automatically selecting the file path associated with the removable storage device.

20. A portable device, comprising:
an interface to operatively connect to a removable storage device, wherein the removable storage device includes stored data;
a memory storing an application configured to process the stored data and a file path associated with the removable storage device, wherein the file path is unknown by the portable device; and
a processor configured to determine that a first size associated with a root directory corresponding to the removable storage device differs from a second size associated with a root directory corresponding to a host device and to automatically select the file path based upon a comparison between the first size and the second size, to verify the selected file path, and to access the stored data on the removable storage device.

21. The portable device of claim 20, wherein the portable device comprises one of a phone device, a personal digital assistant, and a computer.

22. A portable electronic system, comprising:
a host device; and
a removable storage device embedded in the host device, wherein the removable storage device includes a file path that is unknown by the host device, wherein the host device includes:
an interface operatively connected to receive the removable storage device;
a memory including a first size of a first root directory corresponding to the removable storage device and a second size of a second root directory corresponding to the host device; and
a processor configured to determine that the first size associated with the root directory corresponding to the removable storage device differs from the second size associated with the root directory corresponding to the host device, to select a file path associated with the removable storage device based upon a comparison between the first size of the first root directory corresponding to the removable storage device and the second size of the second root directory corresponding to the host device, and to verify the selected file path.

23. The portable electronic system of claim 22, wherein the removable storage device includes a secure flash memory card.

24. The portable electronic system of claim 22, wherein the processor is further configured to determine that the first size differs from the second size.

25. A removable storage device, comprising:
an interface configured to operatively connect to a host device;
a memory including a first root directory having a first size, wherein the memory is associated with a file path that is unknown by the host device; and
a processor configured to indicate the first size of the first root directory to the host device, wherein the processor is responsive to a validation command that is received from an application at the host device via a file path that is selected based on the first size of the first root directory differing from a second size of a second root directory corresponding to the host device.

26. The removable storage device of claim 25, wherein the memory includes an electronic credential used to verify the file path.

27. The removable storage device of claim 25, wherein the removable storage device includes a secure flash memory card.

28. The removable storage device of claim 25, wherein the processor is further configured to determine that the first size differs from the second size.

* * * * *

UNITED STATES PATENT AND TRADEMARK OFFICE
CERTIFICATE OF CORRECTION

PATENT NO. : 8,433,734 B2
APPLICATION NO. : 12/494233
DATED : April 30, 2013
INVENTOR(S) : Xian Jun Liu et al.

It is certified that error appears in the above-identified patent and that said Letters Patent is hereby corrected as shown below:

In the Claims section, Column 10, Claim 20, Lines 18-19, "to automatically select the file path based upon a comparison between the first size and the second size, to" should read --to select the file path based upon a comparison between the first size and the second size, to--.

Signed and Sealed this
Twenty-fifth Day of June, 2013

Teresa Stanek Rea
*Acting Director of the United States Patent and Trademark Office*